United States Patent
Chen et al.

(10) Patent No.: US 9,114,713 B2
(45) Date of Patent: Aug. 25, 2015

(54) ENERGY MANAGEMENT DEVICE AND METHOD FOR A VEHICLE

(71) Applicant: Automotive Research & Testing Center, Changhua County (TW)

(72) Inventors: Chien-An Chen, Changhua County (TW); Kuo-Liang Weng, Changhua County (TW); Yen-Ting Cheng, Changhua County (TW); Deng-He Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 84 days.

(21) Appl. No.: 14/140,454

(22) Filed: Dec. 24, 2013

(65) Prior Publication Data

US 2015/0175012 A1    Jun. 25, 2015

(51) Int. Cl.
*B60L 9/00*     (2006.01)
*B60L 11/00*    (2006.01)
*B60L 11/18*    (2006.01)

(52) U.S. Cl.
CPC ............. *B60L 11/005* (2013.01); *B60L 11/182* (2013.01); *B60L 11/1861* (2013.01)

(58) Field of Classification Search
CPC ....... B60L 11/1816; H02J 7/0054; H02J 7/02; H02J 7/345
USPC ............ 701/22; 320/104, 105, 109, 116, 137, 320/166, 167; 180/65.1, 65.21, 65.29; 903/903, 907; 702/60, 61, 63, 64, 65; 307/10.7
See application file for complete search history.

(56) References Cited

U.S. PATENT DOCUMENTS

| | | | | |
|---|---|---|---|---|
| 7,808,214 | B2 * | 10/2010 | Bartilson | 320/167 |
| 8,027,760 | B2 * | 9/2011 | Chattot | 701/22 |
| 8,400,106 | B2 * | 3/2013 | Midrouillet et al. | 320/109 |
| 2010/0089672 | A1 * | 4/2010 | Lee et al. | 180/65.275 |
| 2010/0207588 | A1 * | 8/2010 | Lowenthal et al. | 320/165 |
| 2010/0211643 | A1 * | 8/2010 | Lowenthal et al. | 709/206 |
| 2010/0320965 | A1 * | 12/2010 | Kissel, Jr. | 320/109 |
| 2011/0056407 | A1 * | 3/2011 | Roodenburg et al. | 105/49 |
| 2011/0168463 | A1 * | 7/2011 | Perkins et al. | 180/65.21 |
| 2011/0285345 | A1 * | 11/2011 | Kawai et al. | 320/107 |
| 2012/0056600 | A1 * | 3/2012 | Nevin | 320/167 |
| 2012/0232729 | A1 * | 9/2012 | Yang | 701/22 |
| 2013/0026989 | A1 * | 1/2013 | Gibbs et al. | 320/116 |
| 2013/0218402 | A1 * | 8/2013 | Hoshihara et al. | 701/32.3 |

* cited by examiner

*Primary Examiner* — Khoi Tran
*Assistant Examiner* — Jorge Peche
(74) *Attorney, Agent, or Firm* — Allston L. Jones; Peters Verny, LLP (57) ABSTRACT

An energy management device includes an energy transfer unit, and a control unit that generates a control signal based at least on a residual electric quantity of each of high power and high energy storage devices of a vehicle, whether the energy transfer unit is coupled to an external energy source, and a position of the vehicle. The energy transfer unit performs, based on the control signal, energy transfer among the external energy source, the high power and high energy storage devices, and at least one energy load of the vehicle.

15 Claims, 4 Drawing Sheets

ENERGY MANAGEMENT DEVICE AND METHOD FOR A VEHICLE

BACKGROUND OF THE INVENTION

1. Field of the Invention

This invention relates to energy management, and more particularly to an energy management device and an energy management method for a vehicle.

2. Description of the Related Art

U.S. Pat. No. 8,027,760 discloses a conventional energy management method for performing power management of an electric vehicle. The electric vehicle includes a supercapacitor, a battery and a plurality of energy loads (e.g., a motor, an air conditioner, etc.). According to the conventional energy management method, when the electric vehicle is located within a predetermined charging area relative to a charge station, the supercapacitor and the battery are charged by the charge station, and energy required by the energy loads is supplied by the charge station, and when the electric vehicle is located outside the charging area, the energy required by the energy loads is supplied by the supercapacitor first, and then by the battery once the residual electric quantity of the supercapacitor has decreased to its minimum value.

However, the conventional energy management method changes the source of the energy required by the energy loads from the charge station directly to the supercapacitor and from the supercapacitor directly to the battery, which results in relatively large temporary drops in input power of each of the energy loads, hindering smooth movement of the electric vehicle. Moreover, the conventional energy management method imposes no restriction on the discharge of the battery, which results in decrease of the lifetime of the battery.

SUMMARY OF THE INVENTION

Therefore, an object of the present invention is to provide an energy management device and an energy management method that can overcome the aforesaid drawbacks associated with the prior art.

According to one aspect of this invention, an energy management device is adapted to be installed in a vehicle that includes a high power storage device, a high energy storage device and at least one energy load. The high power storage device has a power density higher than that of the high energy storage device. The high energy storage device has an energy density higher than that of the high power storage device. The energy management device comprises an energy transfer unit and a control unit. The energy transfer unit is adapted to be coupled to the high power storage device, the high energy storage device and the energy load, and is configured to be coupled to an external energy source when the vehicle is located within a predetermined charging area relative to the external energy source. The control unit is coupled to the energy transfer unit for generating a control signal that is provided to the energy transfer unit based at least on a residual electric quantity of the high power storage device, a residual electric quantity of the high energy storage device, whether the energy transfer unit is coupled to the external energy source, and a position of the vehicle, such that the energy transfer unit performs, based on the control signal, energy transfer among the external energy source, the high power storage device, the high energy storage device and the energy load. When the control unit determines that the energy transfer unit is coupled to the external energy source and that the vehicle is departing from the external energy source, the control unit generates, depends on the position of the vehicle, the control signal that corresponds to an energy transfer to the energy load from only the external energy source, or from both the external energy source and the high power storage device. When the control unit determines that the energy transfer unit is not coupled to the external energy source, that the residual electric quantity of the high energy storage device is greater than a predetermined first lower limit value, and that the residual electric quantity of the high power storage device is greater than a predetermined second lower limit value, the control unit generates, depends on the residual electric quantity of the high power storage device, the control signal that corresponds to an energy transfer to the energy load from only the high power storage device, or from both the high power storage device and the high energy storage device.

According to another aspect of this invention, there is provided an energy management method for performing, using an energy management device installed in a vehicle, energy management of the vehicle. The vehicle includes a high power storage device, a high energy storage device and at least one energy load. The high power storage device has a power density higher than that of the high energy storage device. The high energy storage device has an energy density higher than that of the high power storage device. The energy management device is coupled to the high power storage device, the high energy storage device and the energy load, and is configured to be coupled to an external energy source when the vehicle is located within a predetermined charge area relative to the external energy source. The energy management method comprises the steps of: (A) when the energy management device is coupled to the external energy source, determining, by the energy management device based on a position of the vehicle, whether the vehicle is departing from the external energy source; (B) when it is determined in step (A) that the vehicle is departing from the external energy source, performing, by the energy management device based at least on the position of the vehicle, energy transfer to the energy load from only the external energy source or from both the external energy source and the high power storage device; (C) when the energy management device is not coupled to the external energy source, determining, by the energy management device, whether a residual electric quantity of the high energy storage device is greater than a predetermined first lower limit value; (D) when it is determined in step (C) that the residual electric quantity of the high energy storage device is greater than the first lower limit value, determining, by the energy management device, whether a residual electric quantity of the high power storage device is greater than a predetermined second lower limit value; and (E) when it is determined in step (D) that the residual electric quantity of the high power storage device is greater than the second lower limit value, performing, by the energy management device based at least on the residual electric quantity of the high power storage device, energy transfer to the energy load from only the high power storage device or from both the high power storage device and the high energy storage device.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
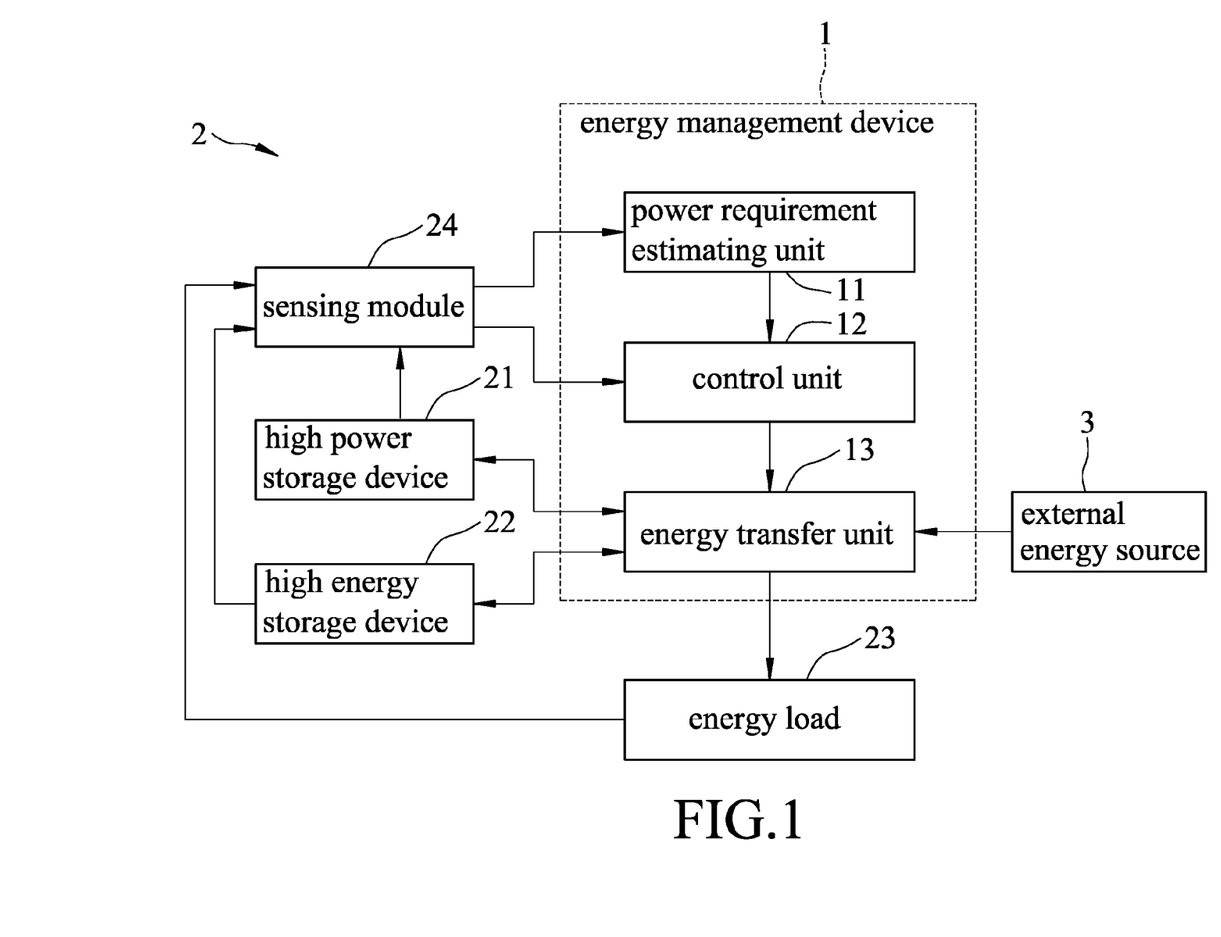
FIG. 1 is a schematic block diagram illustrating the preferred embodiment of an energy management device according to this invention.

Referring to FIG. 1, the preferred embodiment of an energy management device 1 according to this invention is adapted to be installed in a vehicle 2 that includes a high power storage device 21, a high energy storage device 22, at least one energy load 23, a sensing module 24 and other necessary elements (not shown). The high power storage device 21 (e.g., a supercapacitor) has a power density higher than that of the high energy storage device 22. The high energy storage device 22 (e.g., a battery) has an energy density higher than that of the high power storage device 21.

In this embodiment, the vehicle 2 is a pure electric bus that includes a single energy load 23 (i.e., a motor). However, in other embodiments, the vehicle 2 can be a hybrid electric vehicle, can be in other forms such as a scooter and a car, or can include multiple energy loads 23 (e.g., a motor and an air conditioner). Implementation of other embodiments can be known from the following description of this embodiment, and details of the same are omitted herein for the sake of brevity.

The sensing module 24 is coupled to the high power storage device 21, the high energy storage device 22 and the energy load 23 for sensing a plurality of states associated with power required by the vehicle 2 to generate a first sense signal that indicates these states, and for sensing a residual electric quantity of the high power storage device 21 and a residual electric quantity and an output voltage of the high energy storage device 22 to generate a second sense signal that indicates these parameters. In this embodiment, the states associated with the power required by the vehicle 2 include a driving state of the vehicle 2 and an operating state of the energy load 23. The driving state of the vehicle 2 includes speed, a position of an accelerator pedal and a position of a brake pedal. However, in other embodiments where the vehicle 2 is a hybrid electric vehicle, the states associated with the power required by the vehicle 2 may further include an operating state of an engine.

The energy management device 1 of this embodiment includes a power requirement estimating unit 11, an control unit 12 and an energy transfer unit 13.

The power requirement estimating unit 11 is adapted to be coupled to the sensing module 24 for receiving the first sense signal therefrom. The power requirement estimating unit 11 estimates the power required by the vehicle 2 based on the driving state of the vehicle 2 and the operating state of the energy load 23 as indicated by the first sense signal, and generates an estimation signal that indicates the estimated power.

The energy transfer unit 13 is adapted to be coupled to the high power storage device 21, the high energy storage device 22 and the energy load 23, and is configured to be coupled to an external energy source 3 when the vehicle 2 is located within a predetermined charging area relative to the external energy source 3.

The control unit 12 is coupled to the power requirement estimating unit 11 and the energy transfer unit 13, and is adapted to be coupled to the sensing module 24. The control unit 12 receives the estimation signal from the power requirement estimating unit 11, the second sense signal from the sensing module 24, and a third sense signal that indicates whether the energy transfer unit 13 is coupled to the external energy source 3 and that also indicates a position of the vehicle 2. The control unit 12 generates a control signal based on the estimated power as indicated by the estimation signal, the residual electric quantity of the high power storage device 21 and the residual electric quantity of the high energy storage device 22 as indicated by the second sense signal, and whether the energy transfer unit 13 is coupled to the external energy source 3 and the position of the vehicle 2 as indicated by the third sense signal. The control unit 12 outputs the control signal to the energy transfer unit 13 such that the energy transfer unit 13 performs, based on the control signal, energy transfer among the external energy source 3, the high power storage device 21, the high energy storage device 22 and the energy load 23.

In this embodiment, the sensing module 24 further senses whether the energy transfer unit 13 is coupled to the external energy source 3 and also senses the position of the vehicle 2 so as to generate the third sense signal that indicates this information. However, in other embodiments, it may as well be the external energy source 3 that senses whether the energy transfer unit 13 is coupled to the external energy source 3 and also senses the position of the vehicle 2, and that generates the third sense signal and outputs the same to the control unit 12. Moreover, the position of the vehicle 2 may be sensed using image recognition techniques or magnetic valves.

Figure 2:
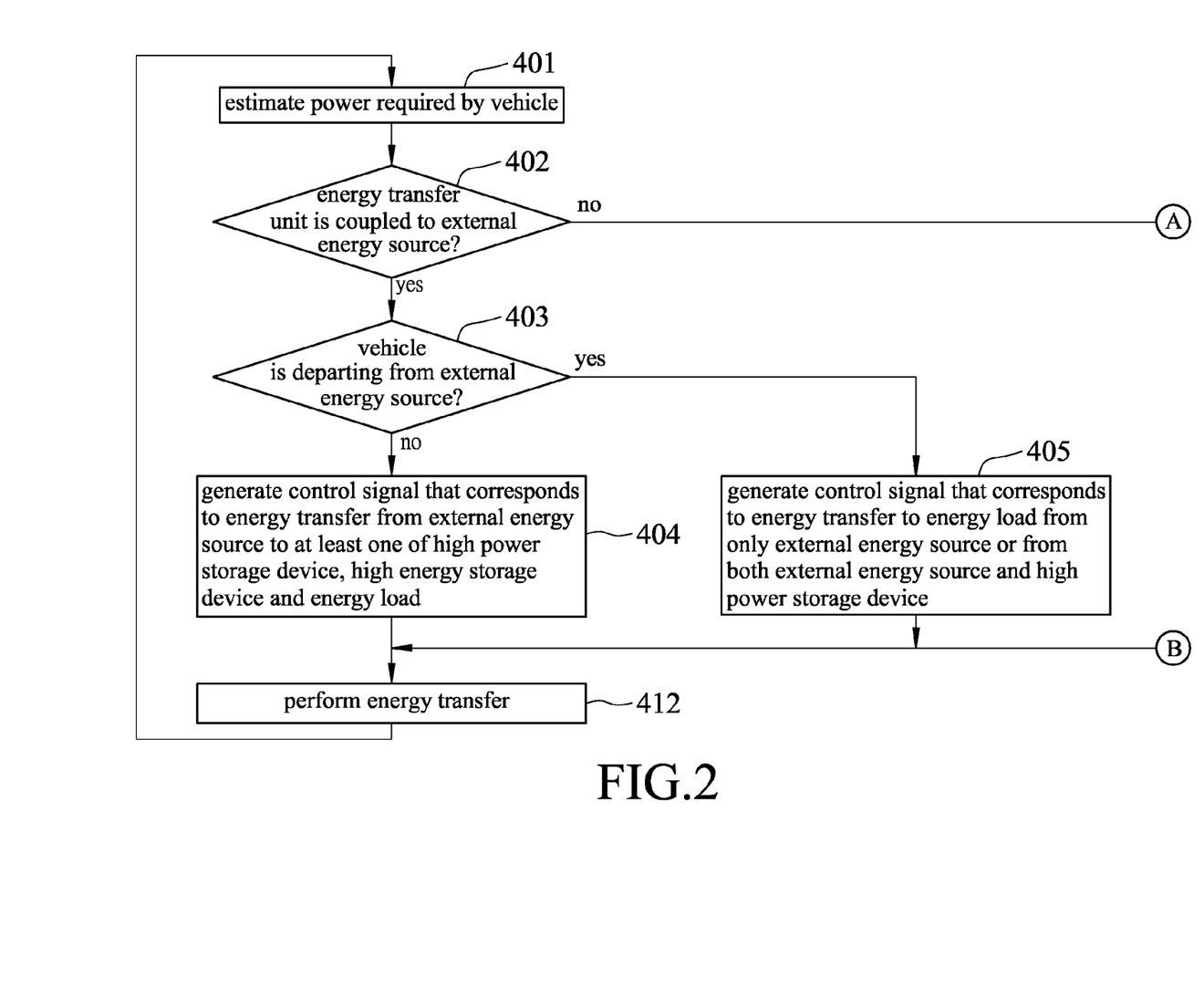
FIGS. 2 and 3 are flow charts illustrating an energy management method performed by the preferred embodiment.
Figure 3:
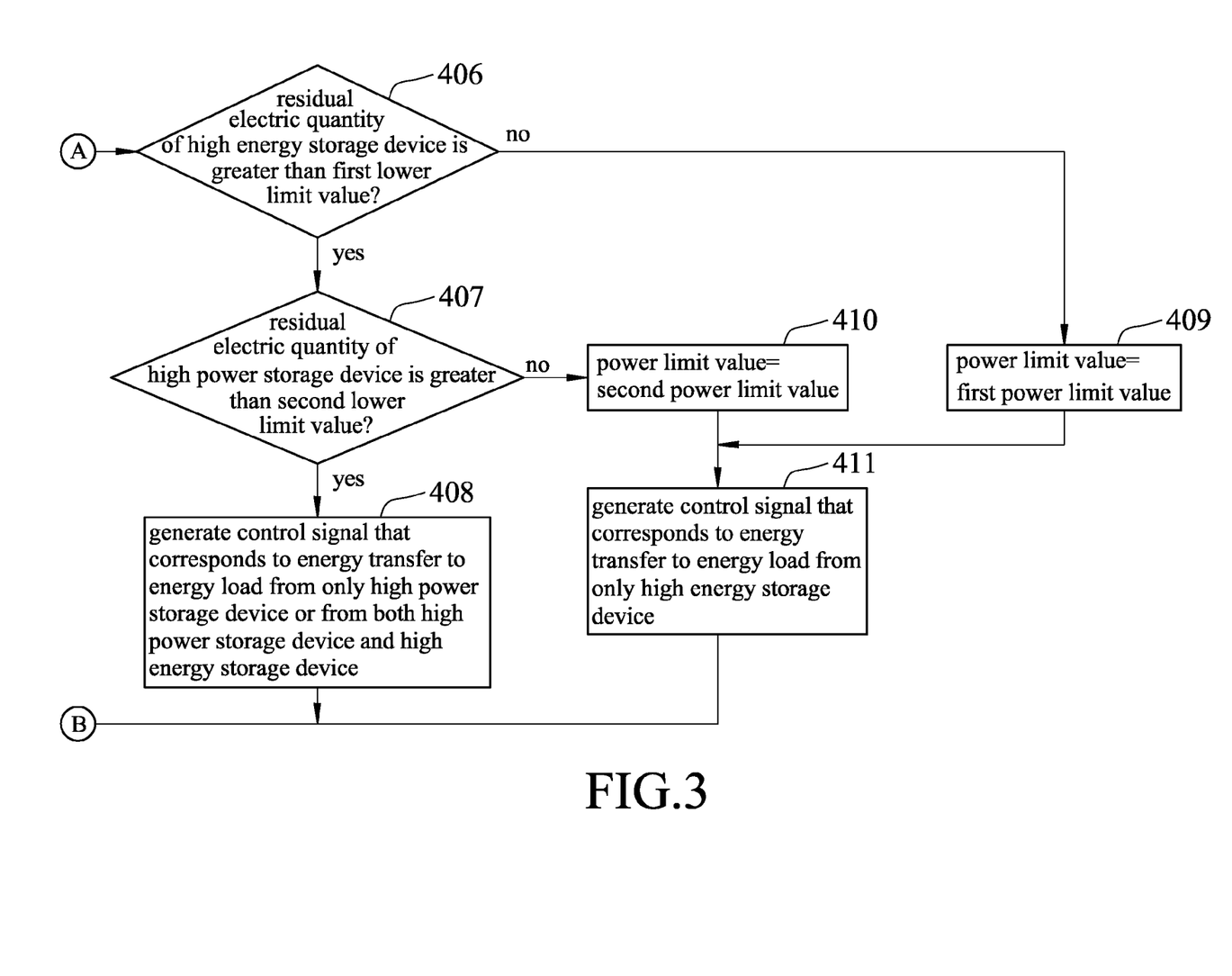

Referring to FIGS. 1-3, an energy management method performed by the energy management device 1 of this embodiment includes the following steps 401-412.

In step 401, the power requirement estimating unit 11 estimates the power required by the vehicle 2 based on the driving state of the vehicle 2 and the operating state of the energy load 23 as indicated by the first sense signal, and generates the estimation signal that indicates the estimated power.

In step 402, the control unit 12 determines, based on the third sense signal, whether the energy transfer unit 13 is coupled to the external energy source 3. If affirmative, the flow proceeds to step 403. Otherwise, the flow goes to step 406.

In step 403, the control unit 12 determines, based on the position of the vehicle 2 as indicated by the third sense signal, whether the vehicle 2 is departing from the external energy source 3. If negative (i.e., if the vehicle 2 is approaching the external energy source 3 or stops), the flow proceeds to step 404. Otherwise, the flow goes to step 405.

In this embodiment, the charging area is defined between a predetermined enter location and a predetermined exit location that are associated with the external energy source 3, and has a predetermined switch location between the enter location and the exit location and a predetermined stop location between the enter location and the switch location. The vehicle 2 enters the charging area from the enter location, stops at the stop location, and leaves the charging area from the exit location. The control unit 12 determines whether the vehicle 2 is departing from the external energy source 3 based on whether the position of the vehicle 2 is between the stop location and the exit location. If the position of the vehicle 2 is between the stop location and the exit location, it is determined that the vehicle 2 is departing from the external energy source 3.

In step 404, the control unit 12 generates the control signal that corresponds to an energy transfer from the external energy source 3 to at least one of the high power storage device 21, the high energy storage device 22 and the energy load 23. Then, the flow goes to step 412.

In step 405, the control unit 12 generates, based on the position of the vehicle 2 as indicated by the third sense signal, the control signal that corresponds to one of the following: a) an energy transfer to the energy load 23 from only the external energy source 3, where output power of the external energy source 3 is equal to the estimated power; and b) an energy transfer to the energy load 23 from both the external energy source 3 and the high power storage device 21, where the output power of the external energy source 3 and output power of the high power storage device 21 depend on the position of the vehicle 2 and a sum thereof is equal to the estimated power. Then, the flow goes to step 412.

In this embodiment, if the position of the vehicle 2 is between the enter location and the switch location (more particularly between the stop location and the switch location), the control unit 12 generates the control signal that corresponds to the energy transfer to the energy load 23 from only the external energy source 3 where the output power of the external energy source 3 is equal to the estimated power. If the position of the vehicle 2 is between the switch location and the exit location, the control unit 12 generates the control signal that corresponds to the energy transfer to the energy load 23 from both the external energy source 3 and the high power storage device 21, where the output power of the external energy source 3 (Pes) and the output power of the high power storage device 21 (Php) are defined as follows:

$$Pes = D1/D2 \times Pset1,$$

$$Php = PR - Pes,$$

where D1 is a distance between the exit location and the position of the vehicle 2, D2 is a distance between the switch location and the exit location, Pset1 is a predetermined first power setting value, and PR is the estimated power.

In step 406, the control unit 12 determines whether the residual electric quantity of the high energy storage device 22 as indicated by the second sense signal is greater than a predetermined first lower limit value. If affirmative (i.e., if the residual electric quantity of the high energy storage device 22 is sufficiently high), the flow proceeds to step 407. Otherwise (i.e., if the residual electric quantity of the high energy storage device 22 is insufficient), the flow goes to step 409.

In step 407, the control unit 12 determines whether the residual electric quantity of the high power storage device 21 as indicated by the second sense signal is greater than a predetermined second lower limit value. If affirmative (i.e., if the residual electric quantity of the high power storage device 21 is sufficiently high), the flow proceeds to step 408. Otherwise (i.e., if the residual electric quantity of the high power storage device 21 is insufficient), the flow goes to step 410.

In step 408, the control unit 12 generates, based on the residual electric quantity of the high power storage device 21 as indicated by the second sense signal, the control signal that corresponds to one of the following: a) an energy transfer to the energy load 23 from only the high power storage device 21, where the output power of the high power storage device 21 is equal to the estimated power; and b) an energy transfer to the energy load 23 from both the high power storage device 21 and the high energy storage device 22, where the output power of the high power storage device 21 and output power of the high energy storage device 22 depend on the residual electric quantity of the high power storage device 21 and a sum thereof is equal to the estimated power. Then, the flow goes to step 412.

In this embodiment, if the residual electric quantity of the high power storage device 21 is greater than a predetermined threshold value that is greater than the second lower limit value, the control unit 12 generates the control signal that corresponds to the energy transfer to the energy load 23 from only the high power storage device 21 where the output power of the high power storage device 21 is equal to the estimated power. If the residual electric quantity of the high power storage device 21 is smaller than the predetermined threshold value, the control unit 12 generates the control signal that corresponds to the energy transfer to the energy load 23 from both the high power storage device 21 and the high energy storage device 22, where the output power of the high power storage device 21 (Php) and the output power of the high energy storage device 22 (Phe) are defined as follows:

$$Php = (Qhp - Q2)/(Q1 - Q2) \times Pset2,$$

$$Phe = PR - Php,$$

where Qhp is the residual electric quantity of the high power storage device 21, Q1 is the threshold value, Q2 is the second lower limit value, Pset2 is a predetermined second power setting value, and PR is the estimated power.

In step 409, the control unit 12 causes a power limit value to be equal to a predetermined first power limit value. Then, the flow goes to step 411.

In step 410, the control unit 12 causes the power limit value to be equal to a predetermined second power limit value that is greater than the first power limit value.

In this embodiment, the control unit 12 multiplies the output voltage of the high energy storage device 22 as indicated by the second sense signal by a predetermined current upper limit value to generate the second power limit value. The current upper limit value is not greater than a rated value of an output current of the high energy storage device 22.

In step 411, the control unit 12 generates the control signal that corresponds to an energy transfer to the energy load 23 from only the high energy storage device 22 where the output power of the high energy storage device 22 is equal to a smaller one of the estimated power and the power limit value.

In step 412, the energy transfer unit 23 performs, based on the control signal, the energy transfer among the external energy source 3, the high power storage device 21, the high energy storage device 22 and the energy load 23. Then, the flow goes back to step 401.

Figure 4:
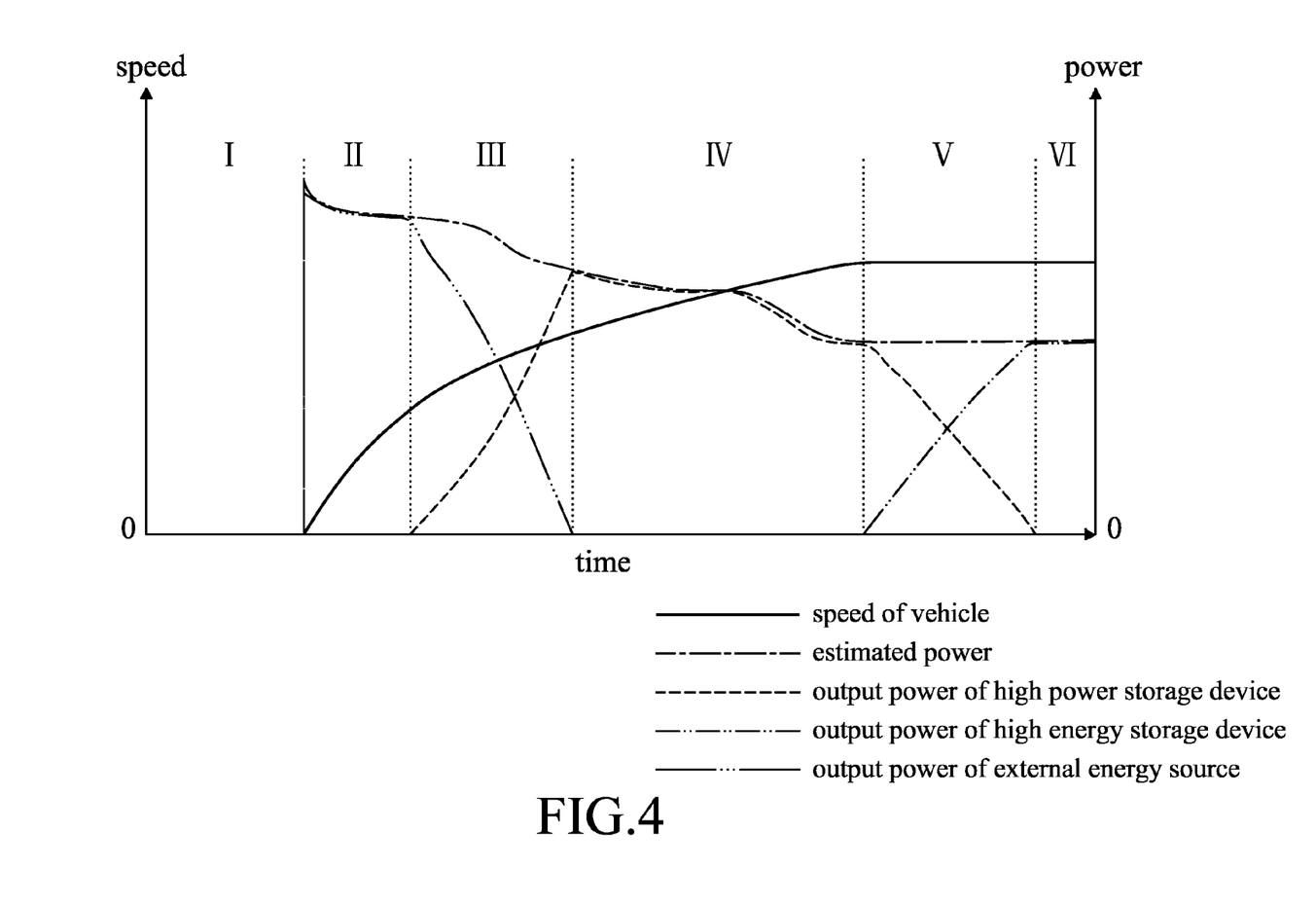
FIG. 4 is a timing diagram illustrating operation of the preferred embodiment.

Referring to FIGS. 1 and 4, for example, during a time period beginning from when the vehicle 2 first stops at the stop location to be charged by the external energy source 3 continuing through to when the vehicle 2 leaves the charging area and moves beyond the charging area, operation of the energy management device 1 of this embodiment can be divided into six phases that include first to sixth phases (I-VI).

In the first phase (I), the vehicle 2 stops at the stop location, and the energy transfer unit 13 is coupled to the external energy source 3. Here, the energy load 23 (i.e., the motor) does not operate, a speed of the vehicle 2 is equal to zero, and the estimated power is equal to zero. Thus, the control unit 12 performs step 404 (see FIG. 2) such that the energy transfer unit 13 performs the energy transfer from the external energy source 3 to the high power storage device 21, and further to the high energy storage device 22 and the energy load 23 if necessary. In other words, the external energy source 3 charges the high power storage device 21, and further charges the high energy storage device 22 if necessary, such that the residual electric quantity of the high power storage device 21 is greater than the threshold value and such that the residual electric quantity of the high energy storage device 22 is greater than the first lower limit value.

In the second phase (II), the vehicle 2 starts to depart from the external energy source 3, the position of the vehicle 2 is between the stop location and the switch location, and the energy transfer unit 13 is still coupled to the external energy source 3. Here, the energy load 23 (i.e., the motor) starts to operate, the speed of the vehicle 2 starts to increase, and the estimated power is greater than zero. Thus, the control unit 12 performs step 405 (see FIG. 2) such that the energy transfer unit 13 performs the energy transfer to the energy load 23 from only the external energy source 3, where the output power of the external energy source 3 is equal to the estimated power. In other words, the external energy source 3 stops charging the high power storage device 21 and the high energy storage device 22, and supplies energy to the energy load 23 for operating the vehicle 2.

In the third phase (III), the vehicle 2 keeps on departing from the external energy source 3, the position of the vehicle 2 is between the switch location and the exit location, and the energy transfer unit 13 is still coupled to the external energy source 3. Here, the energy load 23 (i.e., the motor) keeps on operating, the speed of the vehicle 2 keeps on increasing, and the estimated power is greater than zero. Thus, the control unit 12 performs step 405 (see FIG. 2) such that the energy transfer unit 13 performs the energy transfer to the energy load 23 from both the external energy source 3 and the high power storage device 21, where the output power of the external energy source 3 decreases gradually, the output power of the high power storage device 21 increases gradually, and the sum of the output power of the external energy source 3 and the output power of the high power storage device 21 is equal to the estimated power. In other words, both the external energy source 3 and the high power storage device 21 supply energy for the operation of the vehicle 2.

In the fourth phase (IV), the vehicle 2 leaves the charging area, the residual electric quantity of the high power storage device 21 is greater than the threshold value, and the residual electric quantity of the high energy storage device 22 is greater than the first lower limit value. Here, the energy load 23 (i.e., the motor) keeps on operating, the speed of the vehicle 2 keeps on increasing, and the estimated power is greater than zero. Thus, the control unit 12 performs step 408 (see FIG. 3) such that the energy transfer unit 13 performs the energy transfer to the energy load 23 from only the high power storage device 21, where the output power of the high power storage device 21 is equal to the estimated power. In other words, only the high power storage device 21 supplies energy for operation of the vehicle 2.

In the fifth phase (V), the vehicle 2 keeps on moving beyond the charging area, the residual electric quantity of the high power storage device 21 decreases to a value between the second lower limit value and the threshold value, and the residual electric quantity of the high energy storage device 22 is still greater than the first lower limit value. Here, the energy load 23 (i.e., the motor) keeps on operating, the speed of the vehicle 2 reaches a target speed, and the estimated power is greater than zero. Thus, the control unit 12 performs step 408 (see FIG. 3) such that the energy transfer unit 13 performs the energy transfer to the energy load 23 from both the high power storage device 21 and the high energy storage device 22, where the output power of the high power storage device 21 decreases gradually, the output power of the high energy storage device 22 increases gradually, and a sum of the output power of the high power storage device 21 and the output power of the high energy storage device 22 is equal to the estimated power. In other words, both the high power storage device 21 and the high energy storage device 22 supply energy for the operation of the vehicle 2.

In the sixth phase (VI), the vehicle 2 keeps on moving beyond the charging area, and the residual electric quantity of the high power storage device 21 decreases to a value less than the second lower limit value. Here, the energy load 23 (i.e., the motor) keeps on operating, the speed of the vehicle 2 is maintained at the target speed, and the estimated power is greater than zero. Thus, when the residual electric quantity of the high energy storage device 22 is greater than the first lower limit value, the control unit 12 performs steps 410 and 411 (see FIG. 3) such that the energy transfer unit 13 performs the energy transfer to the energy load 23 from only the high energy storage device 22, where the output power of the high energy storage device 22 is not greater than the second power limit value, and when the residual electric quantity of the high energy storage device 22 decreases to a value less than the first lower limit value, the control unit 12 performs steps 409 and 411 (see FIG. 3) such that the energy transfer unit 13 still performs the energy transfer to the energy load 23 from only the high energy storage device 22, but the output power of the high energy storage device 22 is not greater than the first power limit value. In other words, only the high energy storage device 22 supplies energy for operation of the vehicle 2.

In view of the above, the energy management device 1 of this embodiment changes the source of the energy required by the energy load 23 from the external energy source 3 to both the external energy source 3 and the high power storage device 21 and then to only the high power storage device 21, and changes the source of the energy required by the energy load 23 from the high power storage device 21 to both the high power storage device 21 and the high energy storage device 22 and then to only the high energy storage device 22. This prevents a relatively large temporary drop in input power of the energy load 23. Therefore, the vehicle 2 can move smoothly. Moreover, when the residual electrical quantity of the high power storage device 21 or the residual electrical quantity of the high energy storage device 22 is insufficient, the energy management device 1 of this embodiment imposes a restriction on discharge of the high energy storage device 22, which prevents decrease of a lifetime of the high energy storage device 22.

While the present invention has been described in connection with what are considered the most practical and preferred embodiment, it is understood that this invention is not limited to the disclosed embodiment but is intended to cover various arrangements included within the spirit and scope of the broadest interpretation and equivalent arrangements.

What is claimed is:

1. An energy management device adapted to be installed in a vehicle that includes a high power storage device, a high energy storage device and at least one energy load, the high power storage device having a power density higher than that of the high energy storage device, the high energy storage device having an energy density higher than that of the high power storage device, said energy management device comprising:

an energy transfer unit adapted to be coupled to the high power storage device, the high energy storage device and the energy load, said energy transfer unit being configured to be coupled to an external energy source when the vehicle is located within a predetermined charging area relative to the external energy source; and a control unit coupled to said energy transfer unit, and generating a control signal that is provided to said energy transfer unit based at least on a residual electric quantity of the high power storage device, a residual electric quantity of the high energy storage device, whether said energy transfer unit is coupled to the external energy source, and a position of the vehicle, such that said energy transfer unit performs, based on the control signal, energy transfer among the external energy source, the high power storage device, the high energy storage device and the energy load;

wherein, when said control unit determines that said energy transfer unit is coupled to the external energy source and that the vehicle is departing from the external energy source, said control unit generates, depending on the position of the vehicle, the control signal that corresponds to an energy transfer to the energy load from only the external energy source, or from both the external energy source and the high power storage device; and wherein, when said control unit determines that said energy transfer unit is not coupled to the external energy source, that the residual electric quantity of the high energy storage device is greater than a predetermined first lower limit value, and that the residual electric quantity of the high power storage device is greater than a predetermined second lower limit value, said control unit generates, depending on the residual electric quantity of the high power storage device, the control signal that corresponds to an energy transfer to the energy load from only the high power storage device, or from both the high power storage device and the high energy storage device.

2. The energy management device of claim 1, further comprising:

a power requirement estimating unit for estimating power required by the vehicle based on a driving state of the vehicle and an operation state of the energy load, and generating an estimation signal that indicates the estimated power;

wherein said control unit is coupled further to said power requirement estimating unit for receiving the estimation signal therefrom, said control unit generating the control signal based further on the estimated power as indicated by the estimation signal, when said energy transfer unit receives the control signal that corresponds to the energy transfer to the energy load from only the external energy source, said energy transfer unit performs the energy transfer such that output power of the external energy source is equal to the estimated power, when said energy transfer unit receives the control signal that corresponds to the energy transfer to the energy load from both the external energy source and the high power storage device, said energy transfer unit performs the energy transfer such that each of the output power of the external energy source and output power of the high power storage device depends on the position of the vehicle, and such that a sum of the output power of the external energy source and the output power of the high power storage device is equal to the estimated power, when said energy transfer unit receives the control signal that corresponds to the energy transfer to the energy load from only the high power storage device, said energy transfer unit performs the energy transfer such that the output power of the high power storage device is equal to the estimated power, and when said energy transfer unit receives the control signal that corresponds to the energy transfer to the energy load from both the high power storage device and the high energy storage device, said energy transfer unit performs the energy transfer such that each of the output power of the high power storage device and output power of the high energy storage device depends on the residual electric quantity of the high power storage device, and such that a sum of the output power of the high power storage device and the output power of the high energy storage device is equal to the estimated power.

3. The energy management device of claim 2, wherein the predetermined charge area is defined between a predetermined enter location and a predetermined exit location that are associated with the external energy source, and has a predetermined switch location between the predetermined enter location and the predetermined exit location.

4. The energy management device of claim 3, wherein, when said control unit determines that said energy transfer unit is coupled to the external energy source and that the vehicle is departing from the external energy source, if the position of the vehicle is between the enter location and the switch location, said control unit generates the control signal that corresponds to the energy transfer to the energy load from only the external energy source, and if the position of the vehicle is between the switch location and the exit location, said control unit generates the control signal that corresponds to the energy transfer to the energy load from both the external energy source and the high power storage device, where the output power of the external energy source and the output power of the high power storage device are defined as follows:

$$Pes = D1/D2 \times Pset1,$$

$$Php = PR - Pes,$$

where Pes is the output power of the external energy source, Php is the output power of the high power storage device, D1 is a distance between the exit location and the position of the vehicle, D2 is a distance between the exit location and the switch location, Pset1 is a predetermined first power setting value, and PR is the estimated power.

5. The energy management device of claim 2, wherein, when said control unit determines that said energy transfer unit is not coupled to the external energy source, that the residual electric quantity of the high energy storage device is greater than the first lower limit value, and that the residual electric quantity of the high power storage device is greater than the second lower limit value, if the residual electric quantity of the high power storage device is greater than a predetermined threshold value that is greater than the second lower limit value, said control unit generates the control signal that corresponds to the energy transfer to the energy load from only the high power storage device, and if the residual electric quantity of the high power storage device is smaller than the predetermined threshold value, said control unit generates the control signal that corresponds to the energy transfer to the energy load from both the high power storage device and the high energy storage device, where the output power of the high power storage device and the output power of the high energy storage device are defined as follows:

$$Php = (Qhp - Q2)/(Q1 - Q2) \times Pset2,$$

$$Phe = PR - Php,$$

where Php is the output power of the high power storage device, Phe is the output power of the high energy storage device, Qhp is the residual electric quantity of the high power storage device, Q1 is the threshold value, Q2 is the second lower limit value, Pset2 is a predetermined second power setting value, and PR is the estimated power.

6. The energy management device of claim 2, wherein, when said control unit determines that said energy transfer unit is coupled to the external energy source and that the vehicle is not departing from the external energy source, said control unit generates the control signal that corresponds to an energy transfer from the external energy source to at least one of the high power storage device, the high energy storage device and the energy load.

7. The energy management device of claim 2, wherein:
when said control unit determines that said energy transfer unit is not coupled to the external energy source and that the residual electric quantity of the high energy storage device is not greater than the first lower limit value, said control unit generates the control signal that corresponds to an energy transfer to the energy load from only the high energy storage device, where the output power of the high energy storage device is equal to a smaller one of the estimated power and a predetermined first power limit value; and
when said control unit determines that said energy transfer unit is not coupled to the external energy source, that the residual electric quantity of the high energy storage device is greater than the first lower limit value, and that the residual electric quantity of the high power storage device is not greater than the second lower limit value, said control units generates the control signal that corresponds to the energy transfer to the energy load from only the high energy storage device, where the output power of the high energy storage device is equal to a smaller one of the estimated power and a predetermined second power limit value that is greater than the first power limit value.

8. The energy management device of claim 7, wherein said control unit obtains the second power limit value based on an output voltage of the high energy storage device and a predetermined current upper limit value.

9. An energy management method for performing, using an energy management device installed in a vehicle, energy management of the vehicle, the vehicle including a high power storage device, a high energy storage device and at least one energy load, the high power storage device having a power density higher than that of the high energy storage device, the high energy storage device having an energy density higher than that of the high power storage device, the energy management device being coupled to the high power storage device, the high energy storage device and the energy load, and being configured to be coupled to an external energy source when the vehicle is located within a predetermined charging area relative to the external energy source, said energy management method comprising the steps of:
(A) when the energy management device is coupled to the external energy source, determining, by the energy management device based on a position of the vehicle, whether the vehicle is departing from the external energy source;
(B) when it is determined in step (A) that the vehicle is departing from the external energy source, performing, by the energy management device based at least on the position of the vehicle, energy transfer to the energy load from only the external energy source or from both the external energy source and the high power storage device;
(C) when the energy management device is not coupled to the external energy source, determining, by the energy management device, whether a residual electric quantity of the high energy storage device is greater than a predetermined first lower limit value;
(D) when it is determined in step (C) that the residual electric quantity of the high energy storage device is greater than the first lower limit value, determining, by the energy management device, whether a residual electric quantity of the high power storage device is greater than a predetermined second lower limit value; and
(E) when it is determined in step (D) that the residual electric quantity of the high power storage device is greater than the second lower limit value, performing, by the energy management device based at least on the residual electric quantity of the high power storage device, an energy transfer to the energy load from only the high power storage device or from both the high power storage device and the high energy storage device.

10. The energy management method of claim 9, prior to step (A), further comprising the step of:
(F) estimating, by the energy management device based on a driving state of the vehicle and an operating state of the energy load, power required by the vehicle;
wherein, in step (B), the energy transfer to the energy load from only the external energy source or from both the external energy source and the high power storage device is performed based further on the estimated power obtained in step (F);
wherein, when the energy transfer to the energy load from only the external energy source is performed, output power of the external energy source is equal to the estimated power; and
wherein, when the energy transfer to the energy load from both the external energy source and the high power storage device is performed, each of the output power of the external energy source and output power of the high power storage device depends on the position of the vehicle, and a sum of the output power of the external energy source and the output power of the high power storage device is equal to the estimated power;
wherein, in step (E), the energy transfer to the energy load from only the high power storage device or from both the high power storage device and the high energy storage device is performed based further on the estimated power obtained in step (F);
wherein, when the energy transfer to the energy load from only the high power storage device is performed, the output power of the high power storage device is equal to the estimated power; and
wherein, when the energy transfer to the energy load from both the high power storage device and the high energy storage device is performed, each of the output power of the high power storage device and output power of the high energy storage device depends on the residual electric quantity of the high power storage device, and a sum of the output power of the high power storage device and the output power of the high energy storage device is equal to the estimated power.

11. The energy management method of claim 10, the predetermined charging area being defined between a predetermined enter location and a predetermined exit location that are associated with the external energy source, and having a predetermined switch location between the predetermined enter location and the predetermined exit location, wherein, in step (B),
if the position of the vehicle is between the enter location and the switch location, the energy transfer to the energy load from only the external energy source is performed, and if the position of the vehicle is between the switch location and the exit location, the energy transfer to the energy load from both the external energy source and the high power storage device is performed, where the output power of the external energy source and the output power of the high power storage device are defined as follows:

$$Pes = D1/D2 \times Pset1,$$

$$Php = PR - Pes,$$

where Pes is the output power of the external energy source, Php is the output power of the high power storage device, D1 is a distance between the exit location and the position of the vehicle, D2 is a distance between the exit location and the switch location, Pset1 is a predetermined first power setting value, and PR is the estimated power.

12. The energy management method of claim 10, wherein, in step (E),
    if the residual electric quantity of the high power storage device is greater than a predetermined threshold value that is greater than the second lower limit value, the energy transfer to the energy load from only the high power storage device is performed, and
    if the residual electric quantity of the high power storage device is smaller than the threshold value, the energy transfer to the energy load from both the high power storage device and the high energy storage device is performed, where the output power of the high power storage device and the output power of the high energy storage device are defined as follows:

$$Php = (Qhp - Q2)/(Q1 - Q2) \times Pset2,$$

$$Phe = PR - Php,$$

where Php is the output power of the high power storage device, Phe is the output power of the high energy storage device, Qhp is the residual electric quantity of the high power storage device, Q1 is the threshold value, Q2 is the second lower limit value, Pset2 is a predetermined second power setting value, and PR is the estimated power.

13. The energy management method of claim 9, further comprising the step of:
    (G) when it is determined in step (A) that the vehicle is not departing from the external energy source, performing, by the energy management device, energy transfer from the external energy source to at least one of the high power storage device, the high energy storage device and the energy load.

14. The energy management method of claim 10, further comprising the steps of:
    (H) when it is determined in step (C) that the residual electric quantity of the high energy storage device is not greater than the first lower limit value, performing, by the energy management device, energy transfer to the energy load from only the high energy storage device, where the output power of the high energy storage device is equal to a smaller one of the estimated power and a predetermined first power limit value; and
    (I) when it is determined in step (D) that the residual electric quantity of the high power storage device is not greater than the second lower limit value, performing, by the energy management device, the energy transfer to the energy load from only the high energy storage device, where the output power of the high energy storage device is equal to a smaller one of the estimated power and a predetermined second power limit value that is greater than the first power limit value.

15. The energy management method of claim 14, wherein, in step (I), the second power limit value is obtained by the power management device based on an output voltage of the high energy storage device and a predetermined current upper limit value.

* * * * *